May 16, 1961 H. F. SCHWEDE 2,984,781
APPARATUS FOR THE NONDESTRUCTIVE TESTING OF MATERIALS
Filed March 9, 1953 3 Sheets-Sheet 1

INVENTOR.
HAROLD F. SCHWEDE
BY
HIS ATTORNEYS.

May 16, 1961 H. F. SCHWEDE 2,984,781
APPARATUS FOR THE NONDESTRUCTIVE TESTING OF MATERIALS
Filed March 9, 1953 3 Sheets-Sheet 2

INVENTOR.
HAROLD F. SCHWEDE
BY
HIS ATTORNEYS.

May 16, 1961  H. F. SCHWEDE  2,984,781
APPARATUS FOR THE NONDESTRUCTIVE TESTING OF MATERIALS
Filed March 9, 1953  3 Sheets-Sheet 3
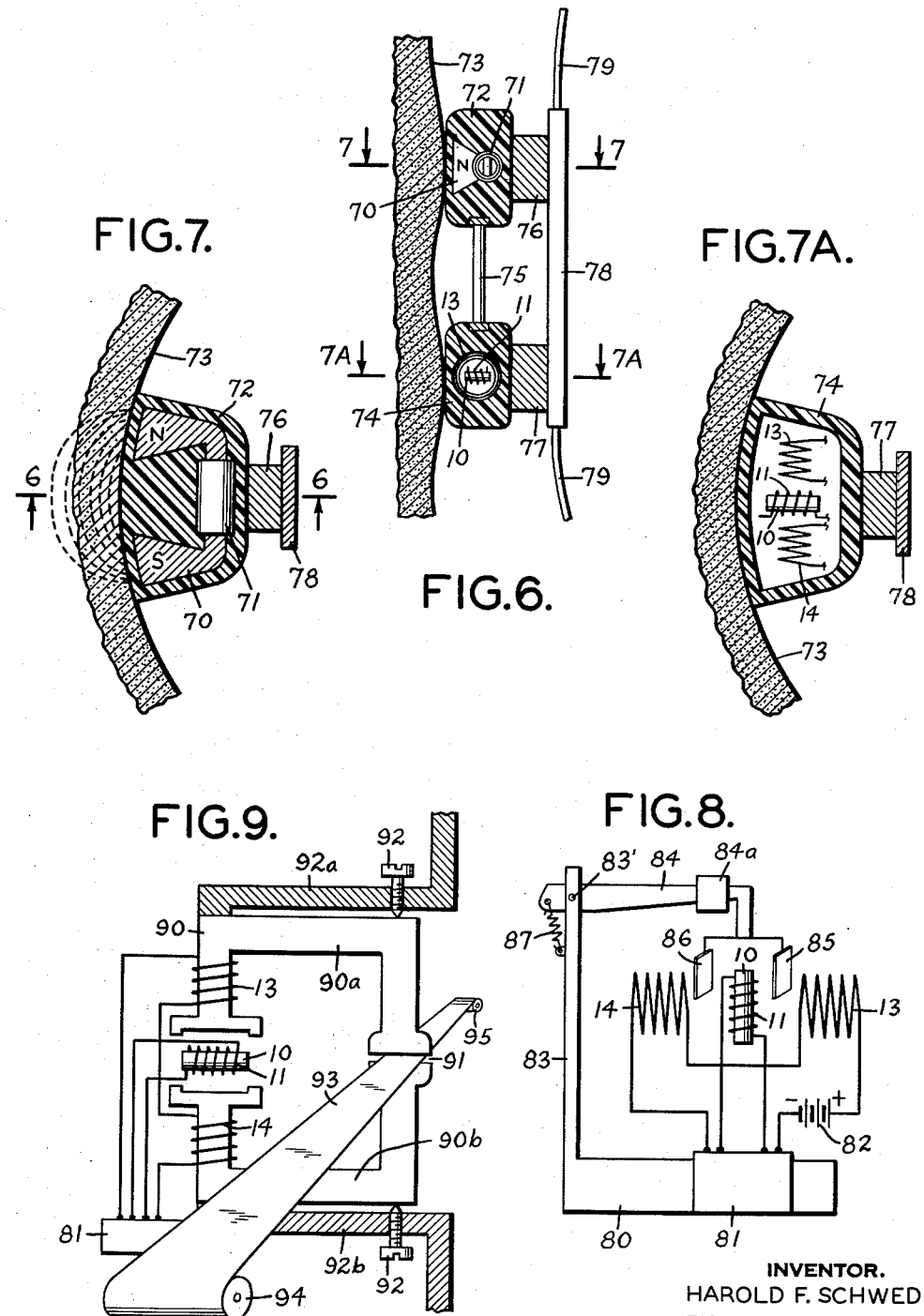
INVENTOR.
HAROLD F. SCHWEDE
HIS ATTORNEYS.

United States Patent Office 2,984,781
Patented May 16, 1961

2,984,781

APPARATUS FOR THE NONDESTRUCTIVE TESTING OF MATERIALS

Harold F. Schwede, Redding, Conn., assignor, by mesne assignments, to Schlumberger Well Surveying Corporation, Houston, Tex., a corporation of Texas Filed Mar. 9, 1953, Ser. No. 341,117

3 Claims. (Cl. 324—.5)

This invention relates to methods and apparatus for the nondestructive testing of materials to obtain desired information as to matters such as their composition, or physical properties, for example. More specifically, it relates to novel and highly effective means of this character which is far more sensitive than the apparatus previously available for this purpose.

Magnetometer type apparatus has been widely used heretofore for the nondestructive testing of materials. In such apparatus, desired information about a test material is usually obtained by observing the interaction between the material and a predetermined magnetic field. While apparatus of this general character has been effective, its utility in some applications is limited because it is not sensitive enough to respond significantly to the very slight interaction between the test material and the predetermined magnetic field that obtains in certain cases.

It is an object of the invention, therefore, to provide novel methods and means for the nondestructive testing of materials, which are free from the above-noted deficiency of the prior art.

A further object of the invention is to provide novel testing methods and means of the above character utilizing molecular resonance phenomena in certain substances for obtaining indications of the interaction between a test material and a magnetic field.

Another object of the invention is to provide novel methods and means of the above character for obtaining indications of the earth's magnetic field or components thereof, in a bore hole drilled into the earth.

Yet another object of the invention is to provide novel geophysical exploring methods and means involving molecular resonance phenomena produced in certain substances when subjected to a magnetic field.

Still another object of the invention is to provide novel methods and means utilizing molecular resonance phenomena in certain substances for investigating magnetic and other characteristics of earth formations traversed by a bore hole.

A further object of the invention is to provide novel methods and means of the above character for investigating conditions prevailing in a bore hole drilled into the earth.

Another object of the invention is to provide new and improved methods and means in which molecular resonance phenomena are employed to determine the degree of uniformity or homogeneity of certain substances or objects.

The invention is based in part upon the important discovery that certain free radicals of molecules of substances, i.e., compounds which contain magnetically noncompensated electrons and are, therefore, paramagnetic absorb energy to a marked degree from an alternating field when the frequency of the field has an appropriate value. This absorption or "resonance" frequency depends on the strength of any external static magnetic field to which the substance may be exposed. The relationship between the frequency and the strength of the static magnetic field is such that fields of extremely small magnitude and relatively minute changes therein can be readily detected.

According to the invention, the nondestructive testing of a material may be effected by exposing a sample of the material to a magnetic field and detecting the interaction between the material and the magnetic field by observing the influence of the latter upon a free radical having the above-noted molecular resonance properties while the radical is simultaneously subjected to an alternating magnetic field. The frequency of the alternating field is adjusted to the value at which a marked absorption of energy occurs, which value is taken as a measure of the strength of the unknown field and is indicative of the nature of the material being tested. Of course, the free radical employed should be one having an appropriate resonance line width, i.e., a line width sufficiently narrow to enable the expected changes in the magnetic field to be detected. Where very high sensitivity is desired, as required to detect very small changes in a magnetic field resulting from the interaction of the field and a material being tested, a free radical such as tris-para-nitrophenyl methyl, which has a very narrow resonance line width, should be used.

In one embodiment, a paramagnetic free radical is exposed simultaneously to a given external static magnetic field adapted to interact with a material to be tested and to an alternating magnetic field maintained constant at the frequency at which molecular resonance or absorption occurs for the free radical placed in the given external magnetic field. Then, as changes occur in the external static magnetic field intensity as a result of interaction of the field and the material to be tested, a frequency shift occurs in the resonance or absorption characteristic of the free radical, producing a corresponding change in the amplitude of the energy absorbed from the constant frequency alternating field. By detecting the direction of the frequency shift (e.g., increase or decrease) and the change in the magnitude of the energy absorbed, the change in the magnetic field strength from its initial value may be readily determined, thus providing useful information about the material being tested.

In a further embodiment, any change in the frequency of the resonance or absorption characteristic of the free radical, caused by a variation in the external magnetic field resulting from the interaction of the field and the material to be tested, is utilized to shift the frequency of the applied alternating field to the new resonance value of the radical corresponding to the new value of the external magnetic field. The change in the frequency of the alternating field may then serve as an indication of a corresponding variation in the external static magnetic field produced by the material being tested.

Methods and apparatus are also provided, according to the invention, which utilize electromagnetic molecular resonance phenomena in certain substances for measuring the earth's magnetic field in a bore hole and for determining the magnetic retentivity and other characteristics of earth formations traversed by the bore hole.

The invention also contemplates the provision of means for making geophysical measurements at the earth's surface and for testing the degree of homogeneity of certain substances or objects.

A better understanding of the invention will be had from the following detailed description of several typical embodiments, taken in conjunction with the accompanying drawings in which:

Fig. 6 illustrates a further modification for measuring the magnetic retentivity of earth formations;

Fig. 7 is a view in transverse section taken along the line 7—7 of Fig. 6, looking in the direction of the arrows;

Fig. 7A is a view in transverse section taken along line 7A—7A of Fig. 6, looking in the direction of the arrows;

Fig. 8 is a schematic drawing of a seismometer constructed according to the present invention; and Fig. 9 illustrates schematically a further modification for determining the homogeneity of materials.

Figure 1:
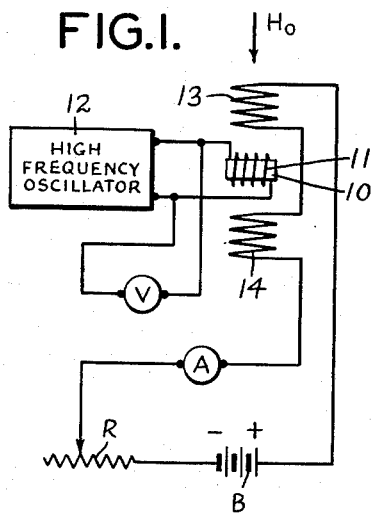
Fig. 1 illustrates in schematic form typical geophysical exploring apparatus constructed according to the present invention.

In Fig. 1, the invention is illustrated as embodied in apparatus for geophysical exporation at the earth's surface. In this apparatus, subsurface anomalies are detected by observing their interaction with a magnetic field which may be the earth's magnetic field, for example. Referring to Fig. 1, the earth's magnetic field, for example, is designated by the arrow Ho.

In accordance with the invention a free radical enclosed in a nonmagnetic container 10 disposed adjacent the earth's surface (not shown) is exposed to the field Ho. As shown in Fig. 1, a coil 11 fed by an oscillator 12 supplies a high frequency alternating field to the radical. If the radical is tris-para-nitrophenyl methyl, for example, it is found that a strong absorption of the energy in this field occurs for a frequency determined substantially by the relation $$fo = 2.8 Ho \qquad (1)$$

where $fo$ is the field or oscillator frequency measured in megacycles and Ho is the magnitude of the earth's magnetic field in gauss.

The absolute value of the field Ho may be determined from Equation 1 by sweeping the frequency of oscillator 12 through a range of values and noting the frequency at which the absorption of energy from the A.C. field occurs, as manifested, for example, by a drop in the high frequency voltage across the coil 11. The frequency of oscillator 12 may then be set at the resonant frequency corresponding to the field Ho. The axis of the coil 11 is preferably disposed normally to the axis of the magnetic field for maximum effect.

In order to measure small variations in the value of the field Ho as the exploring apparatus is moved to different positions at the earth's surface, means is provided for generating an auxiliary adjustable field having a component in the direction of the earth's field component Ho. Suitable means may comprise, for example, a pair of coils 13 and 14 disposed above and below the capsule 10, as shown, and connected in series with a battery B, an adjustable resistance R, and an ammeter A. The axis of coils 13 and 14 is preferably perpendicular to the axis of coil 11. The capsule 10 and the coils 11, 13 and 14 may be mounted on any suitable support (not shown) in such fashion as to enable them to be moved in fixed relation to one another to different positions at the surface of the earth. Initially, the resistance R is adjusted until the magnitude of the auxiliary field is, say, approximately equal to the maximum anticipated variation in the field Ho. The frequency of the oscillator 12 is then adjusted to the resonance frequency corresponding to the new total field at a given location at the surface of the earth.

Now, when a small change in the field Ho occurs, such as might take place when the exploring apparatus is moved to a different location at the earth's surface, the reading of voltmeter V will increase since the new field will not correspond to the resonant frequency to which the oscillator 12 has been set. The resistance R is then adjusted to increase or decrease the current in the coils 13 and 14, and thus the magnitude of the auxiliary magnetic field, to a value that will just compensate for the change in the earth's magnetic field. This is the value at which the reading of the voltmeter V is a minimum, corresponding to maximum absorption of energy from the A.C. field. The change in the reading of ammeter A produced by this adjustment of the resistance R will be proportional to the change in the field Ho. It is well known that the nature of the subterranean formations can be deduced from measurements made at different locations of the earth's magnetic field.

Figure 2:
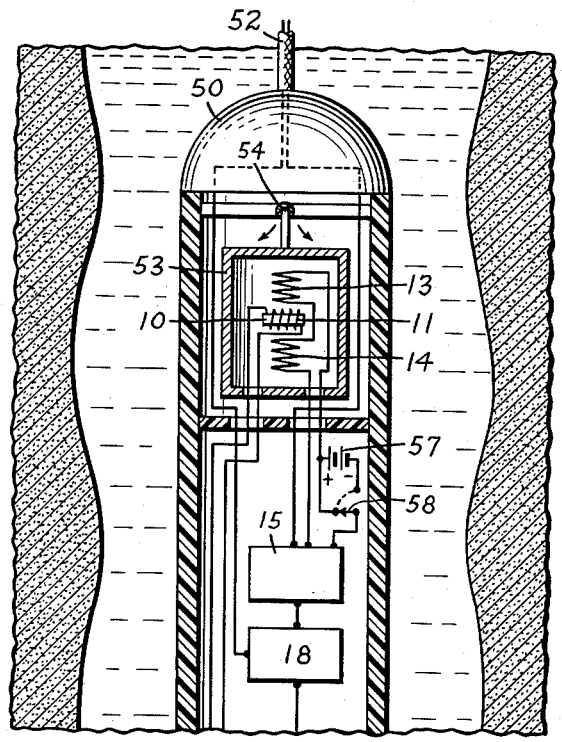
Fig. 2 is a schematic diagram of geophysical exploring apparatus according to the invention for use in a well drilled into the earth.

Fig. 2 shows in schematic form apparatus utilizing molecular resonance phenomena involving a free radical according to the invention for logging variations in the earth's magnetic field along the axis of a bore hole as a function of depth. The apparatus may comprise an elongated nonmagnetic housing 50 which may be raised or lowered in a bore hole 51 by a supporting cable 52 wound on a drum at the surface (not shown) in the conventional manner. Disposed in a container 53 in the housing 50 are the field modulating coils 13, 14 and the A.C. field generating coil 11 encircling the free radical container 10, as in Fig. 1. The remaining components of the detecting system to be described hereinafter may be disposed within the housing, or some of the components may be located at the surface of the earth, suitable conductors within the cable 52 serving to connect them in operable manner.

Figure 3:
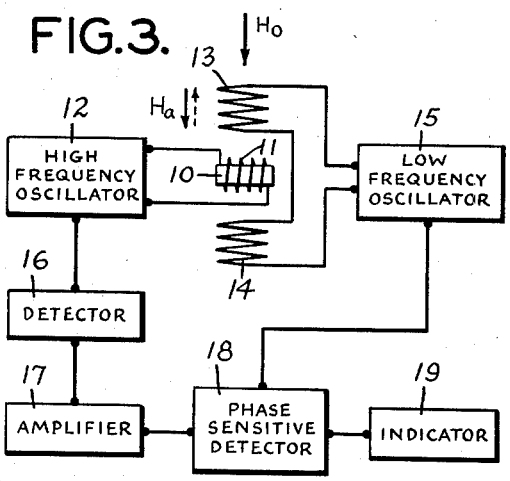
Fig. 3 illustrates schematically one form of detecting circuit usable in the system shown in Fig. 2 in which the frequency of the applied alternating field is maintained constant.

One form of detecting circuit that may be employed in the geophysical prospecting apparatus of Fig. 2 is shown in Fig. 3. In this embodiment, the coils 13 and 14 are connected to a low frequency oscillator 15 which is adapted to superimpose a relatively small alternating magnetic field Ha on the constant field Ho. This produces a corresponding low frequency modulation of the loading on oscillator 12, since the oscillator frequency is maintained at the constant resonance value corresponding only to the field Ho. The low frequency modulation is detected in a detector 16, which may be a conventional amplitude modulation envelope detector, and is passed through an amplifier 17 to a phase sensitive detector 18 which may derive a referencing voltage from the oscillator 15. The output of the detector 18 is conducted to suitable indicating means 19 which may be a simple meter, a galvanometer type film-recording apparatus, or a cathode ray oscilloscope, for example, preferably disposed at the surface of the earth. In this embodiment, a small change in the magnitude of the earth's magnetic field Ho in the bore hole will produce on the indicating means 19 a signal having a magnitude and polarity depending, respectively, on the amount and sense of the change in the amplitude of the field.

Figure 4:
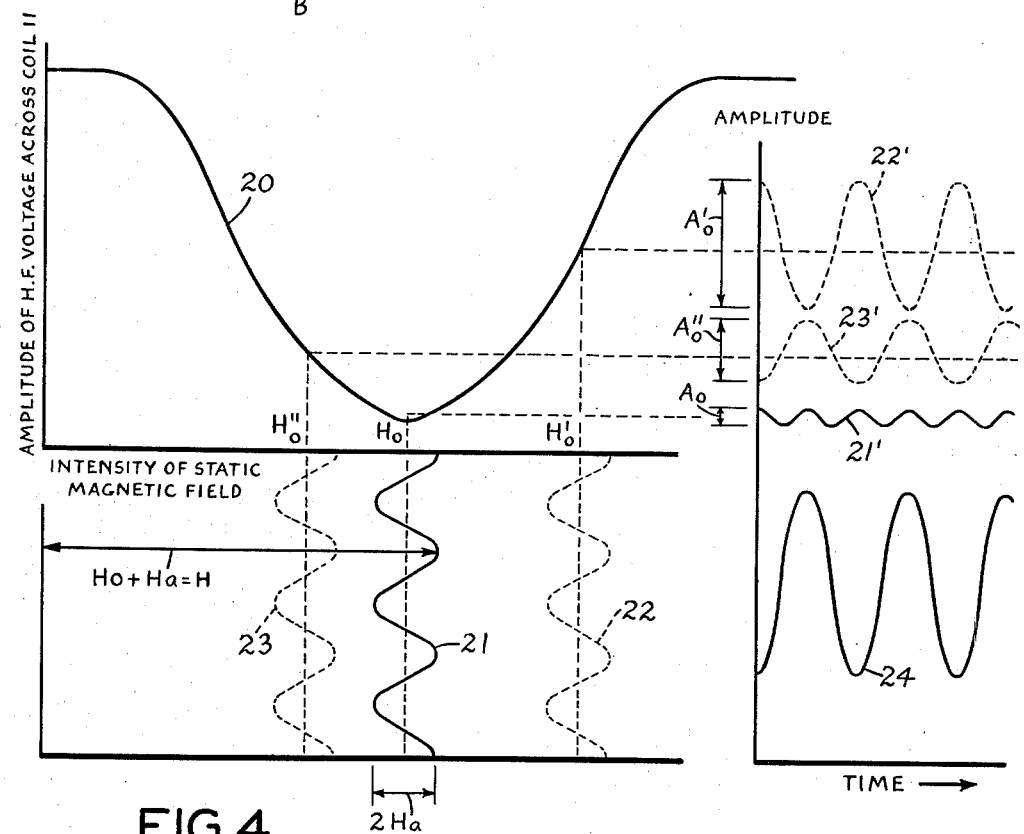
Fig. 4 is a graph of certain wave forms that are useful in explaining the operation of the system shown in Fig. 3.

The operation of the system shown in Fig. 3 may better be understood by referring to Fig. 4 which shows schematically a resonance characteristic curve for an appropriate free radical in the container 10. This curve 20 is greatly exaggerated for purposes of clarity. The abscissa scale represents the intensity of the static magnetic field increasing to the right while the ordinate scale is a parameter proportional to the amplitude of the high frequency voltage across the coil 11. At the field value Ho, maximum absorption of the high frequency energy obtains so that the ordinate has a minimum value.

The low frequency modulation of the field Ho by the coils 13 and 14 is represented by the solid sine wave 21 in Fig. 4. The resultant vector H of the fields Ho+Ha modulates the amplitude of the voltage from the oscillator 12 in a manner represented by the solid wave form 21'. It is this modulation envelope that is detected, amplified, and fed into the phase sensitive detector 18. The action of the detector 18 is such that when it receives the reference voltage from the low frequency oscillator 15, as represented by the wave 24, and the signal wave 21', the average output registered by the indicator 19 is substantially zero. The reason for this is that the signal 21' goes both positive and negative during each half cycle of the reference signal.

Suppose, now, that the system is moved to a new locality where the value of the static field Ho shifts to some unknown value Ho' greater than Ho. For this new value of the static field, a different resonant frequency obtains which may be determined from Equation 1. The low frequency modulating field is now superimposed on the static field Ho' as represented by the dashed wave 22 in Fig. 4. Since the frequency fo of the oscillator 12 is fixed at the old resonance value corresponding to the original static field, the system is off resonance so that much less energy is absorbed from the alternating field. As a result, the low frequency modulation of the voltage across the coil 11 is of the form represented by the dotted curve 22' and has an amplitude Ao' which is a function of the shift in magnitude of the static field from Ho to Ho'.

The low frequency modulation envelope 22' is now detected in the detector 16, amplified by the amplifier 17, and fed to the phase sensitive detector 18 where its polarity is compared with the reference wave 24 (Fig. 4) from the oscillator 15 to determine the direction (i.e., increasing or decreasing) of the change in magnitude of the static field. For the conditions assumed, the modulation envelope is 180° out of phase with the reference wave 24, as shown, so that the output of the detector 18 is a D.C. voltage of one polarity which is taken as denoting an increase in the magnitude of the static field. The magnitude of the D.C. voltage from the detector 18, which is determined by the amplitude Ao' of the modulation wave 22', is a measure of the change in the magnitude of the static field.

As another example, suppose that the intensity of the magnetic field Ho changes to a new value Ho'' which is less than the field Ho, the amount of the change also being less than the increase represented by the value Ho'. The new static field Ho'' with the low frequency modulation superimposed thereon will vary in the manner indicated by the dotted line curve 23 in Fig. 4. Since the oscillator frequency remains fixed at the resonance value corresponding to a static value Ho, the system is again slightly off resonance. As a result, the energy absorbed from the A.C. field is reduced so that the modulation of the voltage across the coil 11 has the form denoted by the dotted line curve 23' and its amplitude is Ao''. However, since the slope of the resonance curve 20 at the abscissa value Ho'' is opposite that of the curve 20 at the abscissa value Ho', the modulation envelope 23' is now in phase with the reference wave 24 (Fig. 4) and 180° out of phase with the modulation envelope 22' which corresponded to the increased magnitude Ho' of the static field.

The modulation envelope denoted by the curve 23' is now fed through the detector 16 and the amplifier 17 to the phase sensitive detector 18. Since the wave 23' is now in phase with the reference wave 24, the polarity of the output from the detector 18 is opposite what it was for the static field value Ho', indicating a decrease in the magnitude of the magnetic field, rather than an increase. Further, the amplitude of the output from the detector 18 is less than it was for the static field Ho', indicating that the magnitude of the decrease from Ho to Ho'' is less than the magnitude of the increase from Ho to Ho', the relative magnitudes being in the same proportion as the amplitudes Ao'' and Ao' of the curves 23' and 22', respectively, in Fig. 4.

It is thus seen that the signal applied to the indicator 19 at the surface of the earth will cause it automatically and continually to show the direction and magnitude of any change in the earth's magnetic field Ho in the bore hole. The indicator 19 may be calibrated to plot the magnitude of the field Ho as a function of different depths in the bore hole, or if the field Ho is changing, as a function of time.

A more complete description of apparatus suited to serve as the phase sensitive detector 18 may be found in pages 111–114 of "Theory of Servo-mechanisms," by James, Nichols, Phillips (vol. 25, Radiation Laboratory Series. First Edition, 1947. McGraw-Hill Book Company, New York). Where the signal-to-noise ratio is likely to be low, an improved phase sensitive detector of the type described in pages 254–255 of "Review of Scientific Instruments," by N. A. Schuster, April 1951, may advantageously be employed.

In operation, the housing 50 is moved along the bore hole and variations in the absolute value of the earth's magnetic field are logged or recorded by the indicator 19 (Fig. 3) as a function of depth.

In the event that it is desired to measure only the vertical component of the earth's magnetic field in the bore hole, a battery 57 may then be switched into the circuit of coils 13 and 14 by a switch 58 as shown schematically in Fig. 2. In this manner a constant vertical field may be established through the capsule 10 by D.C. from the battery 58 passing through coils 13 and 14. To insure that this field will be vertical, the container 53 may be suspended from the housing 50 by any conventional universal joint 54, as shown. The constant vertical field, which may be of the order of only a few gauss, is added to the variable vertical component of the earth's field, so that changes in the latter vertical component will be measurable as first order effects.

Figure 5:
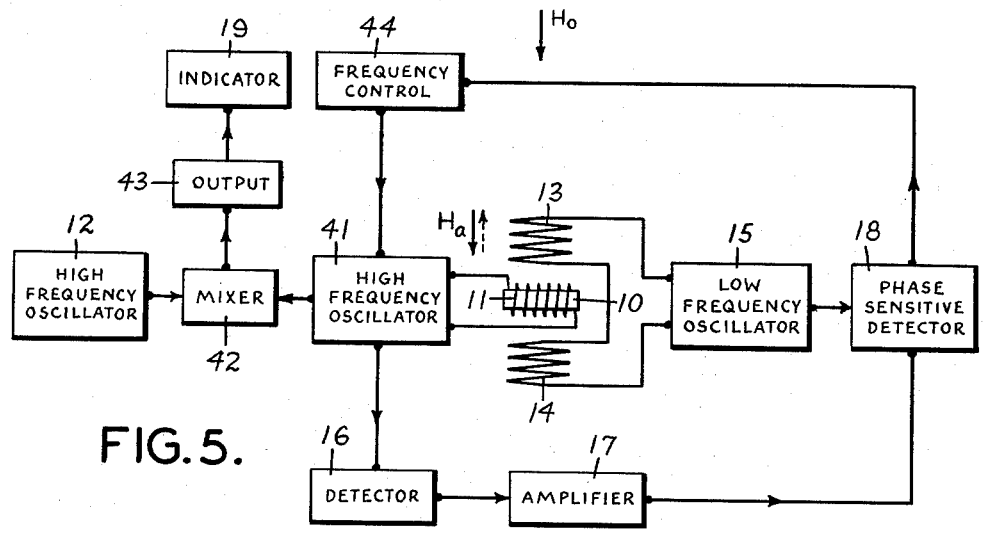
Fig. 5 is a schematic diagram of another detecting circuit embodiment adapted for use in the system of Fig. 2 in which variations in a static magnetic field are utilized to adjust automatically the frequency of the applied alternating field to the molecular resonance frequency.

While the resonance curve 20 in Fig. 4 has been shown as rather broad, in reality it is very sharp and, accordingly, the over-all apparatus is extremely sensitive to small variations in the magnetic field intensity. However, if the variation in the field is more than about 25% of the resonance curve band width, the output signal from the phase sensitive detector 18 will no longer be a function of the shift in the amplitude of the field. In fact, if the change in the field strength is great, the modulated field represented by the curve 21 may move completely off the resonance curve, in which case the modulation envelope of the field generated by the coil 11 would have an amplitude of substantially zero.

Where the range of field intensities that are to be measured is greater than can be accommodated by the detecting circuit of Fig. 3, the detecting circuit of Fig. 5 may be employed in the geophysical exploring apparatus of Fig. 2. In Fig. 5 circuit elements also found in Fig. 3 are designated by the same numerals. In the former figure, the apparatus comprises a high frequency oscillator 41 of adjustable frequency which is connected to energize the coil 11 at a frequency corresponding to the resonance frequency of the free radical in the container 10 in a magnetic field of strength Ho. The output of the oscillator 41 also supplies one input to a mixer circuit 42 which also receives an input from a fixed frequency oscillator 12 generating an alternating signal of a constant frequency which may correspond to the resonance frequency of the free radical in the field Ho, or which may be a known amount less than the resonance frequency. The output of the mixer 42 passes through an output circuit 43 which is adapted to provide a D.C. voltage having a magnitude proportional to the difference in the frequencies generated by the oscillators 12 and 41. This D.C. voltage may be applied to the indicator 19 for observation or recordation on a suitable record strip, for example.

From the detector circuit 18 of Fig. 5, a signal is fed into any suitable frequency control circuit 44 which may include a variable reactance tube, for example, and which is adapted to adjust the frequency of the oscillator 41 in accordance with the output of the detector 18 so as to maintain the latter output substantially zero. The remainder of the system in Fig. 5 is the same as the corresponding part of Fig. 3.

In the operation of the system of Fig. 5, the output of the phase sensitive detector 18 is initially zero since the oscillator 41 is operating at the resonance frequency for the free radical in the earth's magnetic field $Ho$ as in the case of Fig. 3. If, now, the housing 50 (Fig. 2) is moved to a depth in the well where the static field has a different value, say $Ho'$, which may be either greater or less than $Ho$, there will be an output from the detector 18, as explained in connection with Fig. 3, the polarity of which will depend on the direction of the change in the magnitude of the field (i.e., increasing or decreasing), and the magnitude of which will be proportional to the magnitude of the change. This signal will cause the frequency control circuit 44 to increase or decrease the frequency of oscillator 41 by the proper amount to bring it to the new resonance frequency for the free radical in the new value $Ho'$ of the magnetic field. When the correct frequency value is achieved, the output of the detector 18 will fall substantially to zero and the oscillator 41 will stay at its new frequency value.

The mixer circuit 42 and the output circuit 43 will now yield an output proportional to the difference between the new frequency of the oscillator 41 and the constant frequency of the fixed frequency oscillator 12, which may be crystal controlled, for example. The indicator 19 may be calibrated to read the value of the field $Ho'$ corresponding to this new frequency, directly in gauss.

It should be kept in mind that the feedback means comprising the detector 18 and the frequency control circuit 44 is extremely sensitive and rapid in operation, so that the frequency of the oscillator 41 is continuously maintained at the resonance frequency of the free radical as determined by the intensity of the static magnetic field then acting upon it.

It will be readily apparent that the embodiment shown in Fig. 5 is capable of indicating variations in the magnitude of the earth's magnetic field in a bore hole over a substantial range since its operation is not limited to variations in magnetic field intensities within the limits of the resonance linewidth. A slight departure of the magnetic field intensity from the resonance value will generate an error signal which is fed back to the frequency control circuit 44, causing the latter to shift the frequency of the oscillator 41 to maintain the system in resonance. If the frequency of the oscillator 12 is set a known amount below the resonance frequency for a given magnetic field $Ho$, the indicator 19 can be calibrated to read the field $Ho$ corresponding to this known difference. An increase in $Ho$ will then result in an increase in the frequency difference and a decrease in $Ho$ will result in a decrease in the frequency difference.

It will be understood that the container 53 (Fig. 2) may be placed at any desired position in the housing 50. Further, the latter may be provided with suitable means (not shown) to maintain it either centered in the bore hole or against the bore hole side wall. Also, where it is desired to investigate the horizontal component of the earth's magnetic field in the bore hole, this may be done by rotating the coils 13 and 14 through 90° from the positions shown in Fig. 2 about the axis of the coil 11.

Figs. 6, 7 and 7A illustrate a form of the invention employing either of the systems shown in Figs. 3 and 5 for obtaining information about the magnetic retentivity of certain earth formations traversed by a bore hole. It is known that certain ores in subterranean earth formations may become magnetized when subjected to the influence of a magnetizing field. Hence, by measuring the magnetic field strength exhibited by a formation after it has been exposed to the magnetizing field, variations in the residual magnetic field measured will serve as an indication of the presence of different formations.

Referring now to Figs. 6 and 7, the apparatus may comprise a strong magnet 70 which may be either a permanent magnet or an electromagnet excitable by a coil 71, encased in a nonmagnetic housing 72 adapted to be urged against the side wall 73 of a bore hole. The magnet 70 may have north and south poles N and S, respectively, disposed in a plane perpendicular to the bore hole axis as shown in Fig. 7.

The magnetometer apparatus may be encased in a similar housing 74 spaced below the housing 72 by an inextensible flexible rod 75, for example. In the magnetometer apparatus (Fig. 7A), the field modulating coils 13 and 14 of Figs. 3 or 5 may be disposed with their axis directed perpendicularly to the plane of the paper. The coil 11 and container 10 are shown disposed between the coils 13 and 14, the axis of coil 11 being directed perpendicularly to the wall of the bore hole. Electrical connections (not shown) are made between the coils 11, 13 and 14 and electrical apparatus corresponding to that shown in either Fig. 3 or Fig. 5.

The two housings 72 and 74 may be simultaneously urged against the side wall 73 of the bore hole by any suitable means such as, for example, by anchoring them to a backing plate 78 connected to a bowed spring arm 79 supported on a central body (not shown) which may also contain the electrical apparatus, arranged to be lowered or raised along the bore hole by a cable. The bowed spring arm 79 is biased to urge the backing plate 78 and thus the housings 72 and 74 against the side wall 73. By virtue of this construction, the housings 72 and 74 are maintained substantially at a fixed distance from each other, yet are capable of individually following the contour of the adjacent side wall of the bore hole as the apparatus is moved therealong. Obviously, any other suitable means may be employed for urging the housings 72 and 74 against the bore hole side wall.

In operation, as the apparatus shown in Fig. 6 is moved through the bore hole, the magnet 70 impresses a strong magnetizing field indicated by the dashed lines in Fig. 7 upon the adjacent formations so that formations containing magnetic ores or having paramagnetic properties are magnetized thereby. When, a short time later, the magnetometer apparatus in the housing 74 reaches a formation portion previously subjected to the magnetizing field from the magnet 70, it will be influenced by any residual magnetic fields existing in the formations. The variations in the residual magnet field strengths which are indicative of the magnetic retentivity at the formations, may be recorded as a function of depth in the hole by conventional recording means connected to receive the output of the detector 18 (Fig. 3 or Fig. 5). From the retentivity log thus recorded, different formations may be identified by comparison with a similar log taken of known formations.

The apparatus shown in Figs. 6 and 7 may also be used effectively in the practice of other methods such as the determination of permeable formations in a well by locating mud cake containing paramagnetic materials, as disclosed in Patent No. 2,401,280.

Where a free radical such as tris-para-nitrophenyl methyl is used, which has extreme sensitivity to small changes in magnetic fields, i.e., of the order of a few gammas, systems of the type shown in Fig. 3 or Fig. 5 can be advantageously embodied in a wide variety of apparatuses of which the two illustrated in Figs. 8 and 9 are representative. In Fig. 8, a seismometer apparatus is shown schematically which may comprise, for example, a heavy base member 80 anchored securely to the earth. Suitably mounted on the base member 80 is the capsule 10 containing a free radical, the coil 11, and the coils 13 and 14. The remaining components required to form a system of the type shown in Fig. 3 or Fig. 5 may be contained in a box 81. A battery 82 supplies current to the coils 13 and 14 to provide a unidirectional magnetic field acting on the free radical in the container 10.

A vertical support 83 secured to the base member 80 pivotably mounts a light cross arm 84 carrying a mass 84a and supporting a pair of vanes 85 and 86 disposed to intercept and affect the magnetic field established by the coils 13 and 14. The vanes 85 and 86 may be made of nonmagnetic electrically conducting material or of magnetic material. The arm 84 is sensitively balanced on its pivot point 83' by suitable means such as a biasing spring 87.

In operation, earth tremors or artificially induced geophysical vibrations will impart to the light vanes 85 and 86 corresponding movements which, in turn, will modify the magnetic field from the coils 13 and 14 acting on the radical in the container 10. These variations will thus be transduced into an electrical signal which may be recorded as explained above in connection with either Fig. 3 or Fig. 5.

Inasmuch as the apparatus is sensitive to very small changes in magnetic field, it can be used as a transducer of mechanical movement by suitable modification to cause movement of vanes 85 and 86 as in Fig. 8. However, vanes may not be needed since any movement of material in the vicinity of the capsule 10 which causes a change in the external magnetic field will be detected.

The apparatus shown in Fig. 9 is designed to provide indications of the homogeneity of certain materials. In this embodiment, a constant magnetic field is applied to the free radical in the container 10 by means such as a permanent magnet 90 the poles of which carry the modulating coils 13 and 14. The remaining components to form a system of the type shown in either Fig. 3 or Fig. 5 may be disposed in a box 81.

As shown in Fig. 9, the magnet 90 has formed therein a gap 91 which may be varied in width by suitable means such as adjustable set screws 92 threaded in fixed supports 92a and 92b, respectively, and adapted to engage the portions 90a and 90b, respectively, to control the width of the gap. A foil or ribbon 93 of material to be tested may be mounted on rollers 94 and 95 and passed through the gap 91.

In operation, if the foil 93 is uniform, the reluctance path of the magnet 90 will not be substantially changed and the magnetic field acting on the capsule 10 will remain constant. However, if the thickness or quality of the foil 93 changes as it is passed through the gap 91, the magnetic flux will be correspondingly altered and the magnetic field acting on the free radical in the container 10 will be correspondingly changed. For a conductive foil 93, eddy currents will be generated as it is passed through the gap 91, and these eddy currents, which will reflect changes in the thickness or quality of the foil will, in turn generate a magnetic field acting to alter the magnetic flux in the reluctance path of the magnet 90. On the other hand, if the foil 93 is insulative, such as paper, for example, the introduction of a minute amount of foreign matter having paramagnetic properties into the paper during its manufacture will be sufficient to modify the flux density.

It will be apparent that the invention provides novel and highly effective means utilizing molecular resonance phenomena for the nondestructive testing of materials. By using a free radical, such as tris-para-nitrophenyl methyl having a narrow resonance bandwidth, very high sensitivity is achieved since extremely minute changes in a magnetic field produced by a material to be tested may be detected.

In the embodiment shown in Fig. 1, it is not necessary to adjust the resistor R to maintain the system in resonance. Instead, the system may be allowed to go off resonance within the limits of the linewidth of the free radical used, the change in voltage across the coil 11, with appropriate modifications, being taken as a measure of the change in the magnetic field. Since variations of the earth's magnetic field will be less than its own field strength, a free radical having a half linewidth of the order of the strength of the earth's magnetic field would be satisfactory for logging variations in the earth's field by this technique. Thus, the peroxylamine disulfonate ion, which has a resonance line half width of about one-half gauss, as compared to one-quarter gauss or less for the tris-para-nitrophenyl methyl free radical, would be suitable for this purpose, although it is less stable than the latter free radical.

Various other useful embodiments of the invention will occur to those skilled in the art. For example, by providing two longitudinally spaced apart magnetometers of the type shown in Fig. 2, indications could be obtained of the gradient of a magnetic field such as the earth's, for example. Moreover, by suitable adaptation and orientation of the apparatus shown in Fig. 2, other magnetic fields such as those set up by magnetic bore hole markers, for example, could be detected. Similarly, a lost section of drill pipe could easily be located.

Apparatus similar to that illustrated in Fig. 9 and including suitably formed and mounted pole pieces might be disposed for movement through a cased bore with the bore hole casing constituting part of a magnetic path including the coil 11 and the free radical container 10 so as to enable joints, perforations and cracks, or other inhomogeneities in the bore hole casing to be located due to changes in the magnetic reluctance of the material at such points. Similarly, drill pipe, tubing, wire lines and other such equipment can be examined to detect changes in uniformity of fabrication or over a period of time in use. Further, the inhomogeneity of any mud cake formed on bore hole side walls could be similarly indicated when the drilling mud includes magnetic material. Thus, the existence of permeable formations upon which a relatively thick mud cake forms could be exhibited.

By disposing samples of material, whether solid or fluid, in juxtaposition to the container 10, indications of differences in magnetic susceptibility can be determined from the adjustments required to maintain maximum absorption of energy from the oscillator 12 as a function of the applied magnetic field. For example, well cuttings or cores from the bore hole can be examined in that way.

Also, any type of geophysical surface exploration requiring the accurate measurements of small magnetic fields could be accomplished rapidly by the use of apparatus incorporating the sensitive magnetometer means of this invention.

The positions of the coils should be maintained fixed with respect to each other during measurement, because any variations in the relative orientation while keeping the same oscillator frequency will also cause a change in the amplitude of the alternating voltage across coil 11, even though the applied magnetic field remains constant.

A desirable feature during the use of the embodiments shown in Figs. 1 and 3 is to maintain the frequency of the oscillator 12 by appropriate adjustment at the position for magnetic resonance under the resultant applied magnetic field for absolute measurements. The advantage of the apparatus of Fig. 5 is that this frequency adjustment is done automatically.

While the disclosed exemplary embodiments have been described as utilizing molecular resonance phenomena wherein the fundamental constituent parts of the substances within the container 10 comprise unpaired valence electrons of paramagnetic free radicals, it will be apparent to those skilled in the art that many of the principles of the invention will be equally applicable to systems utilizing other known forms of magnetic resonance involving paramagnetism arising from nuclei of non-zero spin, unpaired electrons in transition metals, such as metals in the iron family, which are not valence electrons, or crystalline structures modified so as to produce unpaired electrons such as F centers produced in ionic crystals by radiation. In such applications, the fundamental constituent parts of the substance in the container 10, for example, will be atomic nuclei or electrons.

Still other modifications and applications within the spirit of the invention will occur to those skilled in the art. The specific embodiments disclosed, therefore, are to be regarded merely as illustrative and not as limiting the scope of the following claims.

I claim:

1. In apparatus for the nondestructive testing of materials, the combination of a source of a paramagnetic free radical adapted to be disposed in proximity to a sample of a material to be tested in the presence of a first polarizing magnetic field, means for subjecting said free radical to a high frequency alternating magnetic field disposed at an angle to said polarizing magnetic field, means for superimposing a low frequency modulation on said first magnetic field to cause a corresponding modulation of the energy absorbed from said alternating field, means responsive to said last-named modulation for adjusting the frequency of said high frequency alternating field to maintain said last-named modulation at a reference value, and means providing indications of variations in the frequency of said alternating field.

2. In apparatus for exploring wells drilled into the earth, the combination of a carrier adapted to be moved through a well, a container on said carrier and having a substance comprising the free radical tris-paranitrophenyl methyl therein, field modulating coil means on said carrier positioned to subject said substance to a first magnetic field when energized, second coil means on said carrier positioned to subject said substance to a second magnetic field directed at an angle to said first magnetic field, low frequency oscillator means connected to energize said field modulating coil means to produce an alternating magnetic field to modulate any component of the earth's magnetic field in line therewith, high frequency oscillator means connected to energize said second coil means at the magnetic resonance frequency for said free radical at a reference value of said component of the earth's magnetic field, phase sensitive detector means jointly responsive to the energy delivered by said high frequency oscillator means and to a referencing signal from said low frequency oscillator means for producing signals varying in magnitude and polarity with the amount and sense, respectively, of the change in the amplitude of said earth's magnetic field component, and indicator means responsive to said signals.

3. In apparatus for exploring wells drilled into the earth, the combination of a carrier adapted to be moved through a well, a container on said carrier and having a substance comprising the free radical tris-paranitrophenyl methyl therein, field modulating coil means on said carrier positioned to subject said substance to a first magnetic field when energized, second coil means on said carrier positioned to subject said substance to a second magnetic field directed at an angle to said first magnetic field, low frequency oscillator means connected to energize said field modulating coil means to produce an alternating magnetic field to modulate any component of the earth's magnetic field in line therewith, first high frequency oscillator means of adjustable frequency connected to energize said second coil means at a frequency corresponding to the magnetic resonance frequency of said free radical when said earth's magnetic field component has a reference value, second high frequency oscillator means of fixed frequency, mixer means responsive to said first and second high frequency oscillator means for providing a signal representative of any frequency difference therebetween, indicator means responsive to said signal, signal responsive means for adjusting the frequency of said first high frequency oscillator means, and phase sensitive detector means jointly responsive to the energy delivered to said second coil means by said first high frequency oscillator means and to said low frequency oscillator means for supplying to said first high frequency oscillator means a signal to adjust the frequency thereof to correspond to the value of said earth's magnetic field component then prevailing.

References Cited in the file of this patent

UNITED STATES PATENTS

| | | |
|---|---|---|
| Re. 23,769 | Varian | Jan. 12, 1954 |
| 2,535,666 | Broding | Dec. 26, 1950 |
| 2,561,489 | Block et al. | July 24, 1951 |
| 2,589,494 | Hershberger | Mar. 18, 1952 |
| 2,599,687 | Brant | June 10, 1952 |
| 2,720,625 | Leete | Oct. 11, 1955 |

OTHER REFERENCES

Physical Review, vol. 80, No. 4, November 15, 1950, pp. 580–594.

Review of Scientific Instruments, vol. 19, No. 7, July 1948, pp. 435–439.

Hopkins: Review of Scientific Instruments, vol. 20, No. 6, June 1949, pp. 401, 402.

Pound et al.: Review of Scientific Instruments, vol. 21, No. 3, March 1950, pp. 219–225.

Darrow: Electric Engineering, vol. 70, No. 5, pp. 401–404, May 1951.

Knoebel et al.: Review of Scientific Instruments, vol. 22, No. 12, December 1951.

Townes et al.: Physical Review, vol. 77, No. 1, page 148.